W. Sprague,
Straw Cutter.
No. 94,145. Patented Aug. 24, 1869
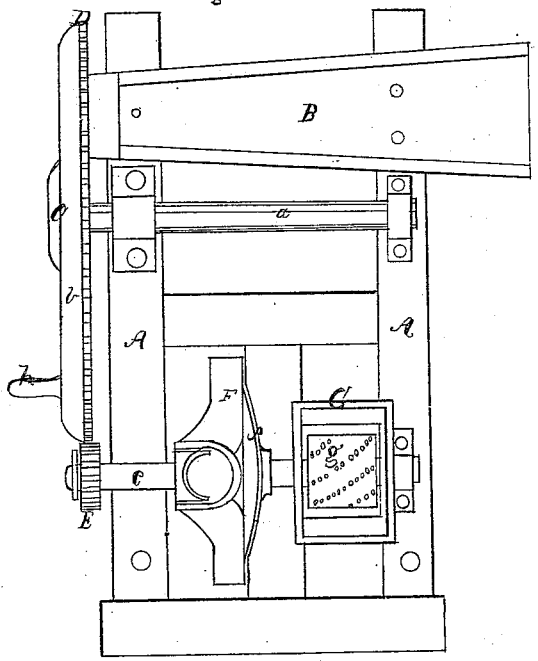
Fig. I.
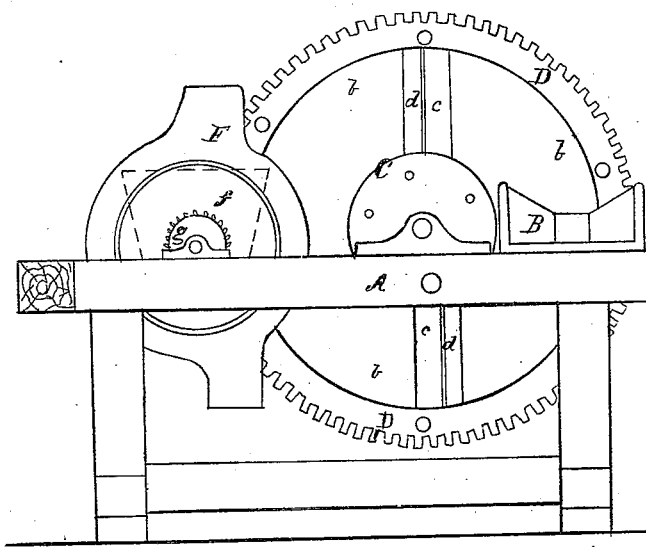
Fig. II.
Witnesses.
W. J. Chamberlain
J. R. Dvale
Welcome Sprague
by
J. Fraser
Atty

United States Patent Office.

WELCOME SPRAGUE, OF FARNHAM, NEW YORK.

Letters Patent No. 94,145, dated August 24, 1869.

IMPROVEMENT IN COMBINED STRAW-CUTTER, CORN-SHELLER, AND GRINDING-MILL.

The Schedule referred to in these Letters Patent and making part of the same.

To all whom it may concern:

Be it known that I, WELCOME SPRAGUE, of Farnham, in the county of Erie, and State of New York, have invented certain new and useful Improvements in Combined Straw-Cutters, Corn-Shellers, and Grinding-Mills; and I do hereby declare that the following is a full and exact description thereof, reference being had to the accompanying drawings, making part of this specification, in which—

Figure 1 is a plan, and
Figure 2, a side elevation.

Like letters of reference indicate corresponding parts in both figures.

My invention consists in the construction and arrangement of the machine as a whole, as hereinafter set forth.

In the drawings—

A indicates the frame, and

B, the straw-box, or trough, placed across it.

The end of the straw-box opens opposite a wheel, C, mounted on shaft $a$, and receiving motion by crank $h$.

This wheel is made depressed, or hollowing on its inner side, as shown at $b$, and has the cutting-knives $c\ c$ placed radially therein, with throats $d\ d$ to discharge the straw through the wheel to the outside, when cut.

The depressed back $b$ serves as the gauge or stop to the hay, as it is pressed forward through the box, and thus insures the exact and proper length of the stuff cut.

The wheel C has a cog-rim, D, which meshes with a pinion, E, upon a shaft, $e$.

On this shaft is situated a shelling-disk, $f$, and a grinding-cylinder, $g$, which parts, combined with case F and hopper G, form respectively a corn-sheller and apple or other grinder.

I am aware that a straw-cutter, corn-sheller, and cider-mill have before been combined, as in patent No. 39,620, August 25, 1863. I do not claim the combination, but only the construction and arrangement of the parts as before described.

A special feature in this combination and arrangement is the wheel C, formed with the depressed face $b$ and the cutters $c\ c$, whereby the straw or hay that is fed up in the box B is gauged to a uniformity of length, and is cut and discharged through the wheel itself, an effect, so far as I am aware, never before accomplished.

At the same time the wheel C, through the medium of cog-rim D, acts as the driving-wheel to the other parts.

Another feature of novelty is making the shelling-disk $f$ act as a balance or fly-wheel, not only to its own shaft, but also to the cutter-wheel C, thereby giving uniformity of power to all the parts without the use of a separate balance-wheel.

Still another feature of novelty is the location and arrangement of the straw-cutter and the shelling and grinding-device, as it were, separate and independent from each other, so that the cut straw will not clog and impede the other parts, and yet the whole so connected that one action gives motion to all the parts.

These features I believe to be new.

I do not claim broadly a combined straw-cutter, corn-sheller, and grinding-mill. Neither do I claim the attachment of knives to a wheel that cuts at right angles to the straw-box, as I am aware that knives have been thus attached to the spokes of an open driving-wheel; but

What I claim, and desire to secure by Letters Patent, is—

1. The wheel C, formed with the depressed face $b$ and cutters $c$, and acting as a driving-wheel, substantially as and for the purpose described.

2. The arrangement with the above of the grinder G $g$, and the sheller F $f$, the disk $f$ of which forms the balance-wheel of the machine, the whole receiving motion by one action, as set forth.

In witness whereof, I have hereunto signed my name, in the presence of two subscribing witnesss.

WELCOME SPRAGUE.

Witnesses:
W. J. CHAMBERLAIN,
ALBERT HAIGHT.